(12) United States Patent
Xia et al.

(10) Patent No.: US 10,963,100 B2
(45) Date of Patent: Mar. 30, 2021

(54) INTERACTIVE OBJECT CONTROL METHOD AND APPARATUS, TERMINAL, AND COMPUTER-READABLE STORAGE MEDIUM

(71) Applicant: Tencent Technology (Shenzhen) Company Limited, Shenzhen (CN)

(72) Inventors: Furong Xia, Shenzhen (CN); Heyun Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/773,851

(22) Filed: Jan. 27, 2020

(65) Prior Publication Data

US 2020/0159367 A1     May 21, 2020

Related U.S. Application Data

(63) Continuation of application No. PCT/CN2018/097250, filed on Jul. 26, 2018.

(30) Foreign Application Priority Data

Aug. 8, 2017   (CN) .......................... 201710668854.0

(51) Int. Cl.
  *G06F 3/041*   (2006.01)
  *G06F 3/0484*  (2013.01)
  *G06F 3/0488*  (2013.01)

(52) U.S. Cl.
  CPC ........ *G06F 3/0418* (2013.01); *G06F 3/04845* (2013.01); *G06F 3/04883* (2013.01)

(58) Field of Classification Search
  CPC .................................................. G06F 3/0481
  See application file for complete search history.

(56) References Cited

U.S. PATENT DOCUMENTS 8,194,036 B1 * 6/2012 Braun ................... G06F 3/0418
                                                    345/157
9,405,387 B2 * 8/2016 Chen ....................... G06F 3/038
(Continued)

FOREIGN PATENT DOCUMENTS

CN    102662673 A    9/2012
CN    104238890 A   12/2014
(Continued)

OTHER PUBLICATIONS

Tencent Technology, ISRWO, PCT/CN2018/097250, dated Oct. 16, 2018, 7 pages.
(Continued)

*Primary Examiner* — Sepehr Azari
(74) *Attorney, Agent, or Firm* — Morgan, Lewis & Bockius LLP (57) ABSTRACT

Embodiments of this application are related to an interactive object control method and performed at a terminal. The method includes: obtaining a quantity of logical pixels corresponding to a touch operation performed on an interactive object on a touchscreen of the terminal; obtaining a logical pixel density of the touchscreen; correcting the quantity of logical pixels corresponding to the touch operation based on the logical pixel density and a reference pixel density; and controlling the interactive object based on the corrected quantity of logical pixels. After the quantity of logical pixels corresponding to the touch operation performed on the interactive object is obtained, the quantity of logical pixels corresponding to the touch operation is corrected based on the logical pixel density and a reference pixel density of the touchscreen and then the interactive object is controlled based on the corrected quantity of logical pixels.

20 Claims, 6 Drawing Sheets

(56) References Cited

U.S. PATENT DOCUMENTS

| | | | |
|---|---|---|---|
| 2011/0185321 A1 | 7/2011 | Capela et al. | |
| 2015/0002397 A1* | 1/2015 | Song | G06F 3/038 |
| | | | 345/163 |
| 2015/0149957 A1* | 5/2015 | Enomoto | G06F 3/0485 |
| | | | 715/784 |
| 2016/0077605 A1* | 3/2016 | Chen | G06F 3/1423 |
| | | | 345/157 |
| 2016/0284058 A1 | 9/2016 | Calderwood et al. | |
| 2020/0218410 A1* | 7/2020 | Zhang | G06F 9/451 |

FOREIGN PATENT DOCUMENTS

| | | |
|---|---|---|
| CN | 104461343 A | 3/2015 |
| CN | 105446496 A | 3/2016 |
| CN | 106095373 A | 11/2016 |
| CN | 107450841 A | 12/2017 |
| JP | 2004288048 A | 10/2004 |

OTHER PUBLICATIONS

Tencent Technology, IPRP, PCT/CN2018/097250, dated Feb. 11, 2020, 6 pages.

* cited by examiner

INTERACTIVE OBJECT CONTROL METHOD AND APPARATUS, TERMINAL, AND COMPUTER-READABLE STORAGE MEDIUM

CROSS-REFERENCE TO RELATED APPLICATIONS

This application is a continuation application of PCT/CN2018/097250, entitled "INTERACTIVE OBJECT CONTROL METHOD AND APPARATUS, TERMINAL, AND COMPUTER-READABLE STORAGE MEDIUM" filed on Jul. 26, 2018, which claims priority to Chinese Patent Application No. 201710668854.0, filed with the Chinese Patent Office on Aug. 8, 2017 and entitled "INTERACTIVE OBJECT CONTROL METHOD AND APPARATUS", both of which are incorporated by reference in their entirety.

FIELD OF THE TECHNOLOGY

Embodiments of this application relate to the field of human-computer interaction techniques, and in particular, to an interactive object control method and apparatus, a terminal, and a computer-readable storage medium.

BACKGROUND OF THE DISCLOSURE

With constant development of touchscreen technology, touch precision and usability of touchscreens are also greater. Correspondingly, there is an increasing number of applications for implementing human-computer interactions by using touch operations in the market. In a typical human-computer interaction application, an interactive object displayed in an application interface may be controlled by using a touch operation on the touchscreen.

In the related art, for an application which has a relatively high requirement on control precision, an action of the interactive object is usually controlled based on a quantity of logical pixels corresponding to a touch operation of a user. For example, by an example in which an interactive object is controlled by using a sliding operation of a user on a touchscreen, after detecting the sliding operation of the user, the terminal obtains a quantity of logical pixels corresponding to the sliding operation, calculates an action amplitude of the interactive object based on a relationship between the quantity of logical pixels and the action amplitude, and controls, based on the calculated action amplitude, the interactive object to make a corresponding action.

In a practical application, for terminals of different models, logical pixel densities on the touchscreens of the terminals are usually different, that is, on different touchscreens, the quantities of logical pixels corresponding to sliding operations of the same physical distance are usually different. Therefore, for the same interactive object, when the user performs the same operation on the touchscreens of terminals of different models, control effects for the interactive object are usually different.

SUMMARY

To resolve the problem in the related art that, for the same interactive object, when a user performs the same operation on touchscreens of terminals of different models, control effects for the interactive object are usually different, embodiments of this application provide an interactive object control method and apparatus, a terminal, and a computer-readable storage medium. The technical solutions are as follows:

According to a first aspect, an interactive object control method is performed at a terminal having one or more processors and memory storing a plurality of programs to be executed by the one or more processors, including:

obtaining, by the terminal, a quantity of logical pixels corresponding to a touch operation performed on an interactive object on a touchscreen of the terminal;

obtaining, by the terminal, a logical pixel density of the touchscreen, the logical pixel density being used for indicating a quantity of logical pixels included in a unit area of the touchscreen;

correcting, by the terminal, the quantity of logical pixels corresponding to the touch operation based on the logical pixel density and a reference pixel density; and controlling, by the terminal, the interactive object based on the corrected quantity of logical pixels.

According to a second aspect, a terminal is provided, the terminal including one or more processors, memory coupled to the one or more processors and a plurality of programs stored in the memory that, when executed by the one or more processors, cause the terminal to perform the aforementioned interactive object control method.

According to a third aspect, a non-transitory computer-readable storage medium is provided, the non-transitory computer readable storage medium storing a plurality of machine readable instructions in connection with a terminal having one or more processors. The plurality of machine readable instructions, when executed by the one or more processors, cause the terminal to perform the aforementioned interactive object control method.

The technical solutions provided in the embodiments of this application may include the following beneficial effects:

after a quantity of logical pixels corresponding to a touch operation performed on an interactive object is obtained, the quantity of logical pixels corresponding to the touch operation is corrected based on a logical pixel density and a reference pixel density of the touchscreen and then the interactive object is controlled based on the corrected quantity of logical pixels, so that when a sliding control operation of the same physical distance is performed on any touchscreen, control effects for the interactive object are finally consistent.

It is to be understood that the foregoing general descriptions and the following detailed descriptions are merely exemplary and interpretive, but cannot constitute a limitation to embodiments of this application.

BRIEF DESCRIPTION OF THE DRAWINGS

The accompanying drawings herein are incorporated in and constitute a part of the description, illustrate embodiments of this application, and are used to explain the principle of embodiments of this application together with the description.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of embodiments of this application.

The solutions shown in the embodiments of this application may be applied to an electronic device in which a human-computer interaction application is installed. The electronic device has a touchscreen, and a control operation on an interactive object displayed in an interface of a human-computer interaction application is implemented by using a touch operation on the touchscreen. For example, the electronic device may be a smart phone, a tablet computer, an e-book reader, a professional game device with a touchscreen, and the like.

Figure 1A:
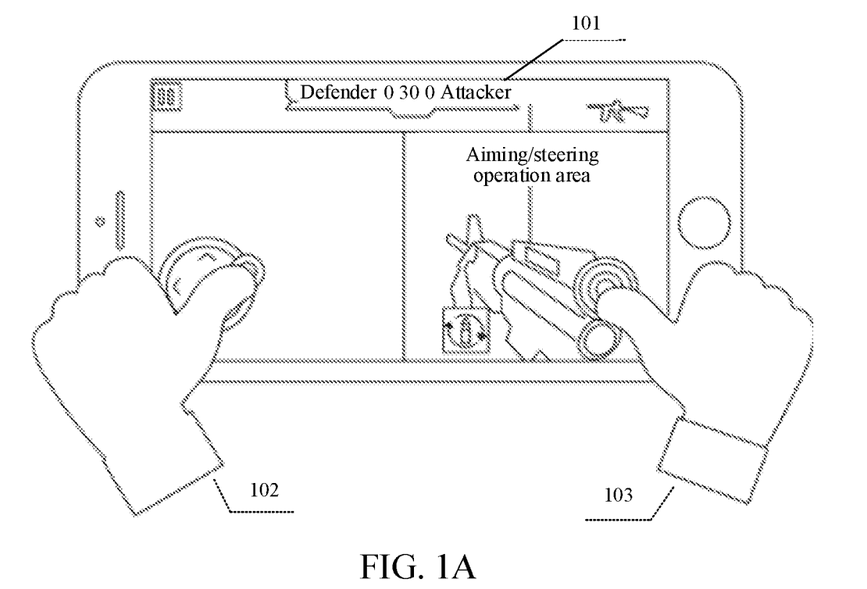
FIG. 1A is a schematic diagram of a human-computer interaction operation according to an embodiment of this application.

By an example in which the electronic device is a smart phone, FIG. 1A is a schematic diagram of a human-computer interaction operation. As shown in FIG. 1A, in an application interface 101 of a First-person shooting game (FPS) application, a left-side area is a moving operation area and a right-side area is an aiming/steering operation area. A user holds the smart phone with two hands. A finger of the user's left hand 102 performs a sliding touch operation in the moving operation area to control an interactive object in the application interface 101 to move (represented as a movement of a scene in the interface of the FPS application), and a moving distance is related to a sliding distance of the user's finger in the moving operation area. A finger of the user's right hand 103 performs a sliding touch operation in the aiming/steering operation area to control the interactive object in the application interface 101 to rotate (represented as a rotation of an angle of view in the interface of the FPS application), and a rotation angle is related to a sliding distance of the user's finger in the aiming/steering operation area.

Before describing solutions in embodiments of this application, terms related to the embodiments of this application are explained and described first:

1) Pixel.

A pixel, also referred to as an image element (px), is a size unit of resolution. In an electronic device, a resolution size is usually indicated by using pixels per inch (PPI) or dots per inch (DPI) as a unit. For example, a resolution of 300×300 PPI indicates that there are 300 pixels per inch both in a horizontal direction and in a vertical direction, and it may alternatively be represented as 90,000 (that is, 300×300) pixels per square inch.

2) Physical Pixel, Physical Pixel Density, and Physical Resolution.

A pixel includes a physical pixel and a logical pixel. The physical pixel is also referred to as a device pixel or a hardware pixel, which is determined by the screen hardware of an electronic device. Each physical pixel is a minimum unit that can control display in the screen of the electronic device. By an example in which the screen of the electronic device is a light emitting diode (LED) liquid crystal display screen, liquid crystals are divided in a grid form on a liquid crystal display board of the LED liquid crystal display screen. If the electronic device can individually control the display of each liquid crystal, each liquid crystal on the liquid crystal display board is a physical pixel.

The quantity of physical pixels of the screen of the electronic device determines a physical pixel density and physical resolution (or referred to as hardware resolution) of the screen. For example, if a physical resolution of a screen of an electronic device is 1024×768, it means that the screen is divided into 1024 physical pixels horizontally and 768 physical pixels vertically. The physical pixel density is the quantity of physical pixels arranged per inch on the screen, or the quantity of physical pixels included in each square inch.

3) Logical Pixel, Logical Pixel Density, and Logical Resolution.

With a constant increase in the PPI of screens of mobile devices, for a developer, more difficulties are to be encountered when using the method of measuring display elements using physical pixels in a software development process. For example, there are cases in which physical resolutions of screens of different terminals are inconsistent, and if the physical pixels are used to measure display elements, the developed software program cannot match the terminals of different screens. Moreover, the logical pixel is an abstract concept put forward to resolve the foregoing problem.

The logical pixel is determined by system software of an electronic device. Each logical pixel may be regarded as a minimum area that can be controlled to display by a software program and that is in a display area of a screen. Different platforms have different literal definitions for logical pixels. For example, in an iOS platform, the logical pixel is referred to as Point (PT), and in an Android platform, the logical pixel is referred to as a device independent pixel (DP or DiP).

A logical pixel density and a logical resolution (also referred to as screen resolution) of the screen of the electronic device depend on a current division of logical pixels of a display area of the screen by the system software. For example, when a logical resolution of the screen of an electronic device is 1024×768, that is, the system software divides the display area of the screen into 1024 logical pixels horizontally and 768 logical pixels vertically. The logical pixel density is the quantity of logical pixels arranged per inch on the screen, or the quantity of logical pixels included in each square inch.

When dividing logical pixels, system software of an electronic device may regard a display area corresponding to one physical pixel as a logical pixel, or may regard a display area corresponding to a plurality of physical pixels as a logical pixel.

Logical pixels of a screen of an electronic device can be adjusted by the software. In a practical application, when a user adjusts a screen resolution of an electronic device, a logical pixel when an image is displayed on the screen of the electronic device changes accordingly. Screen resolutions of the electronic device usually include 1920×1080, 1600×900, 1440×900, 1024×768, 1366×768, and the like. In another case, when an image currently displayed on the screen is manually scaled by using the terminal, for example, when a picture with a fixed logical resolution is scaled, a size of each logical pixel in the picture also changes with a scaling level.

Figure 1B:
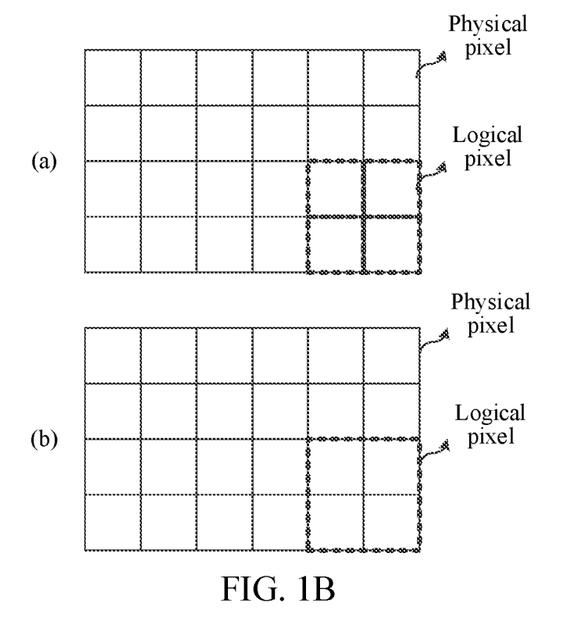
FIG. 1B is a schematic diagram of a correspondence between a logical pixel and a physical pixel according to embodiments of this application.

For example, FIG. 1B is a schematic diagram of a correspondence between a logical pixel and a physical pixel according to embodiments of this application. It is assumed that a physical resolution of a screen of a terminal is 1920×1080, and a maximum logical resolution supported by a system of the terminal is also 1920×1080. In FIG. 1B, each solid-line box represents one physical pixel, and each dashed-line box represents one logical pixel. When the terminal displays a picture at a resolution of 1920×1080, each pixel (that is, logical pixel) in the picture corresponds to one physical pixel, and in FIG. 1B(a), it is indicated by one solid-line box corresponding to one dashed-line box. After a user scales up the picture four times, a display resolution (that is, logical resolution) of the picture is not changed, the display area corresponding to each logical pixel corresponds to an area of four physical pixels, and in FIG. 1B(b), it is indicated by four solid-line boxes corresponding to one dashed-line box.

For an electronic device that has a touchscreen, when a user performs a touch operation on the touchscreen, an operating system/a software program of the electronic device detects an operation amplitude of the touch operation of the user by using the logical pixel as a unit to measure. For example, when the user performs a sliding operation on the touchscreen, among operation information obtained by the operating system/the software program of the electronic device, information used to measure a sliding amplitude of the user is a quantity of logical pixels on the screen that the sliding operation goes through, and the operating system/the software program controls the interactive object based on the quantity of logical pixels that the sliding operation goes through. For touchscreens of electronic devices of different models, the quantities of logical pixels corresponding to the same physical distance are usually inconsistent. Therefore, when the user controls the same interactive object on different electronic devices, control effects corresponding to the same operation amplitude are usually different.

By an example in which the interactive object is a rotatable object, and the interaction logic is that each logical pixel the sliding operation of the user goes through, one unit angle the application controls the interactive object to rotate, if the operating system/the software program directly controls the interactive object to rotate based on a correspondence between the quantity of logical pixels that the sliding operation of the user goes through and the unit angle, rotation angles corresponding to sliding operations of the same physical amplitude may be different in different electronic devices. For example, for the foregoing interactive object, when sliding for a physical distance of 2 cm on a screen of one electronic device, the interactive object may rotate by 40°, and when sliding for the same physical distance of 2 cm on a screen of another electronic device, the interactive object may rotate by 50°.

To avoid a case in which a touch operation of the same amplitude is performed on the screens of different electronic devices and the control effects for an interactive object are different, in the solutions shown in embodiments of this application, when displaying a human-computer interaction application and receiving a touch operation performed by the user on an interactive object on an application display interface on a touchscreen, a terminal may correct a quantity of logical pixels corresponding to the touch operation to achieve an objective that operation effects on the interactive object are the same when the same distance is passed by in terminals of different logical pixel densities.

Figure 2:
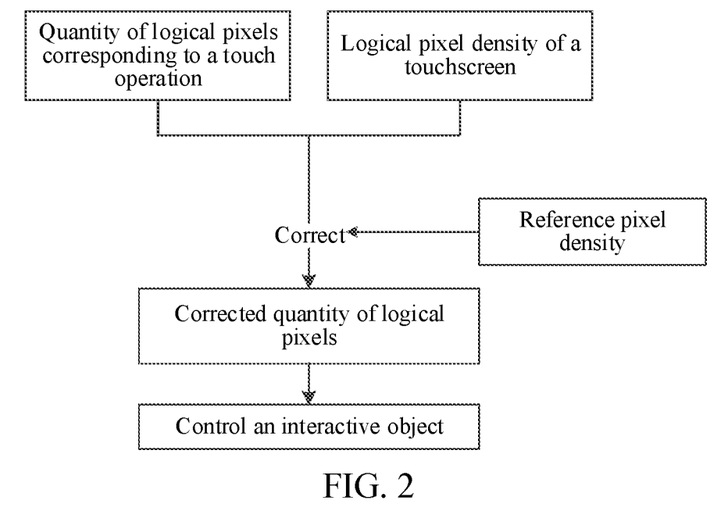
FIG. 2 is a schematic implementation flowchart of a solution according to an embodiment of this application.

Specifically, FIG. 2 is a schematic implementation flowchart of a solution according to an embodiment of this application. As shown in FIG. 2, when a human-computer interaction application is run, after a quantity of logical pixels corresponding to a touch operation performed on an interactive object on a touchscreen of a terminal is obtained, a logical pixel density of the touchscreen is obtained, where the logical pixel density is used for indicating a quantity of logical pixels included in a unit area of the touchscreen. In addition, the quantity of logical pixels corresponding to the touch operation is corrected based on the logical pixel density and a reference pixel density, and finally, the interactive object is controlled based on the corrected quantity of logical pixels.

In solutions shown in this embodiment of this application, after the quantity of logical pixels corresponding to the touch operation performed on the interactive object is obtained, the interactive object is not controlled directly based on the quantity of logical pixels corresponding to the touch operation; instead, the quantity of logical pixels corresponding to the touch operation is corrected based on the logical pixel density of the touchscreen and the reference pixel density and then the interactive object is controlled based on the corrected quantity of logical pixels, so that when a sliding control operation of the same physical distance is performed on any plurality of touchscreens, no matter whether logical pixel densities of the touchscreens are the same, control effects for the interactive object are finally consistent.

Figure 3:
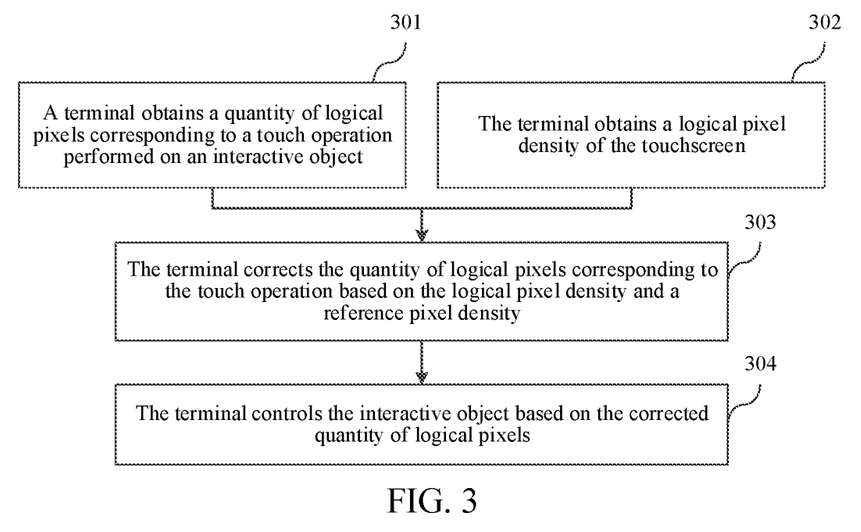
FIG. 3 is a flowchart of an interactive object control method according to an exemplary embodiment of this application.

FIG. 3 is a flowchart of an interactive object control method according to an exemplary embodiment, and the method may be applied to an electronic device in which a human-computer interaction application is installed and that has a touchscreen, and a control operation to an interactive object displayed in an interface of the human-computer interaction application is implemented by using a touch operation on the touchscreen. As shown in FIG. 3, the interactive object control method may include the following steps:

Step S301: A terminal obtains a quantity of logical pixels corresponding to a touch operation performed on an interactive object on a touchscreen of the terminal.

In this embodiment of this application, when an application in the terminal displays an interactive object, a user performs a touch operation for the interactive object. After an operating system of the terminal detects a corresponding touch operation event, the operating system sends the touch operation event to the application, and the application obtains a quantity of logical pixels corresponding to the touch operation based on the touch operation event.

Optionally, the quantity of logical pixels corresponding to the touch operation may be determined with reference to an operable direction of the interactive object and a quantity of logical pixels that the touch operation goes through. Specifically, for example:

1) When the operable direction of the interactive object is omnidirectional, the quantity of logical pixels that the touch operation goes through may be obtained as the quantity of logical pixels corresponding to the touch operation.

Figure 4:
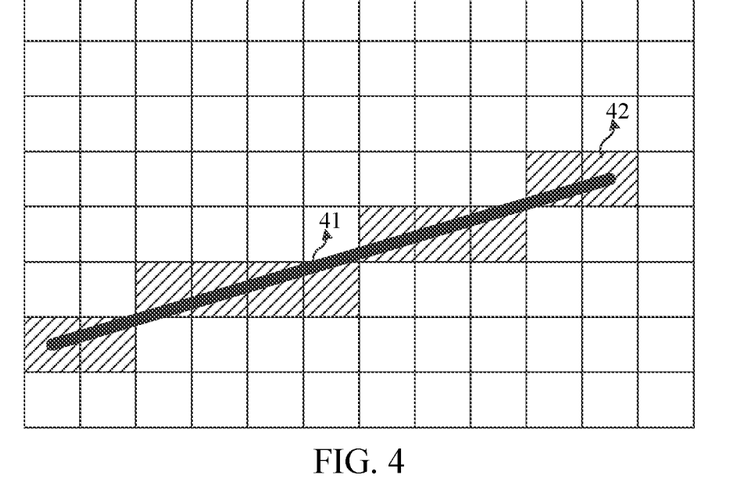
FIG. 4 is a schematic diagram of logical pixels corresponding to a touch operation used in the embodiment of FIG. 3.

Specifically, FIG. 4 is a schematic diagram of logical pixels corresponding to a touch operation according to this embodiment of this application. In FIG. 4, each square indicates one logical pixel, the touch operation is a straight-line sliding operation, and logical pixels that a sliding track 41 of the straight-line sliding operation goes through are pixels 42 in a shadow part in FIG. 4. When the operable direction of the interactive object is omnidirectional, a quantity of logical pixels (that is, the pixels 42 in the shadow part in FIG. 4) that the sliding track of the straight-line sliding operation goes through may be obtained as the quantity of logical pixels corresponding to the touch operation.

2) When the operable direction of the interactive object is a specified direction, a quantity of logical pixels corresponding to a projection of the touch operation in the specified direction may be obtained as the quantity of logical pixels corresponding to the touch operation.

Figure 5:
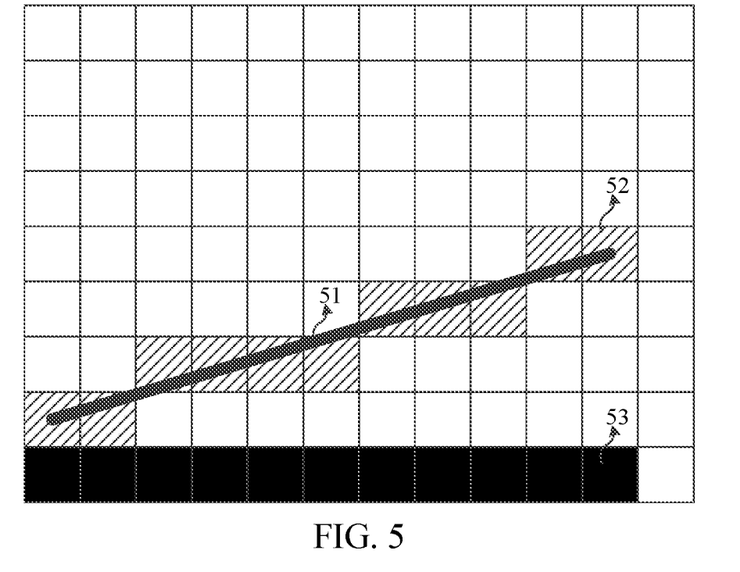
FIG. 5 is another schematic diagram of logical pixels corresponding to a touch operation used in the embodiment of FIG. 3.

For example, FIG. 5 is a schematic diagram of logical pixels corresponding to a touch operation according to this embodiment of this application. In FIG. 5, each square indicates one logical pixel, a touch operation is a straight-line sliding operation, and logical pixels that a sliding track 51 of the straight-line sliding operation goes through are pixels 52 in a shadow part in FIG. 5, and logical pixels corresponding to a projection in a horizontal direction that is of the pixels 52 in the shadow part are pixels 53 in a black filled part in FIG. 5. When the operable direction of the interactive object is a horizontal direction, a quantity of the pixels 53 in the black filled part may be obtained as the quantity of logical pixels corresponding to the touch operation.

Figure 6:
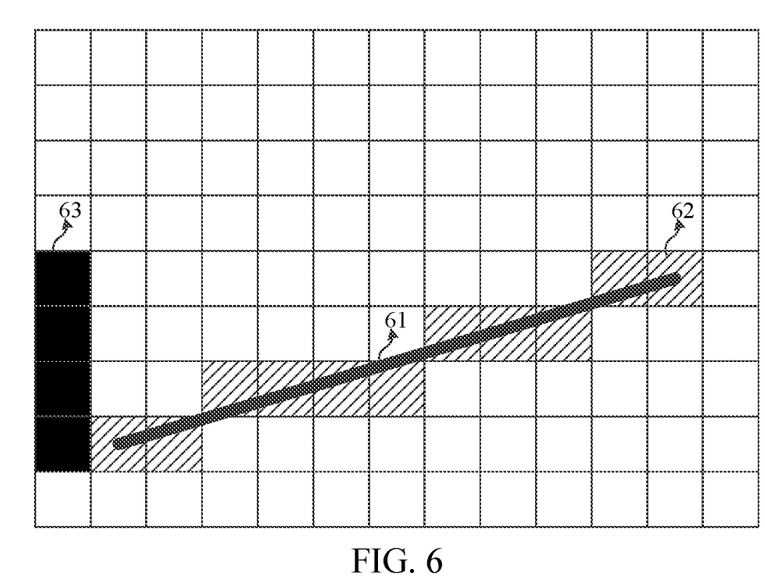
FIG. 6 is still another schematic diagram of logical pixels corresponding to a touch operation used in the embodiment of FIG. 3.

Alternatively, FIG. 6 is another schematic diagram of logical pixels corresponding to a touch operation according to this embodiment of this application. In FIG. 6, each square indicates one logical pixel, a touch operation is a straight-line sliding operation, and logical pixels that a sliding track 61 of the straight-line sliding operation goes through are pixels 62 in a shadow part in FIG. 6, and logical pixels corresponding to a projection in a vertical direction that is of the pixels 62 in the shadow part are pixels 63 in a black filled part in FIG. 6. When the operable direction of the interactive object is a vertical direction, a quantity of the pixels 63 in the black filled part may be obtained as the quantity of logical pixels corresponding to the touch operation.

Step S302: The terminal obtains a logical pixel density of the touchscreen, where the logical pixel density is used for indicating a quantity of logical pixels included in a unit area of the touchscreen.

In this embodiment of this application, the logical pixel density of the touchscreen may be obtained from the operating system of the terminal. Specifically, a system attribute reading object provided by a core component may be obtained. The core component is a third-party core component providing support to an application corresponding to the interactive object, and the system attribute reading object provides a first application programming interface (API) to the outside; the logical pixel density returned by the system attribute reading object is obtained by invoking the first API, and the logical pixel density is obtained by invoking, by the system attribute reading object, a second API provided by the operating system of the terminal.

For example, in an Android system, an application developed based on a Unity engine cannot directly invoke an API provided by the operating system. In this embodiment of this application, the Unity engine may provide an object, and the object may invoke the API provided by the operating system. In addition, the object further provides an API to the outside. When an application developed based on the Unity engine invokes the API provided by the object to read a system attribute, the object may invoke the API provided by the operating system to obtain the system attribute and return the obtained attribute to the application.

Figure 7:
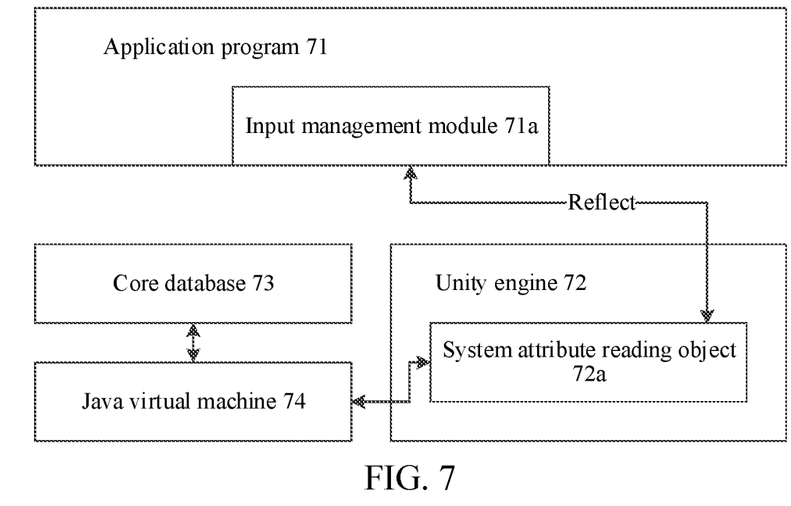
FIG. 7 is a schematic flowchart of obtaining a logical pixel density used in the embodiment of FIG. 3.

Specifically, by an example in which the core component is a Unity engine and the operating system of the terminal is an Android system, FIG. 7 is a schematic flowchart of obtaining a logical pixel density according to this embodiment of this application. In FIG. 7, the application program corresponding to the interactive object is an application program 71. The application program 71 includes an input management module 71a. The input management module 71a is configured to manage a touch operation performed on the interactive object by a user. A Unity engine 72 provides support to the application program 71, and the Unity engine 72 includes a system attribute reading object 72a. The system attribute reading object 72a may be an AndroidJavaObject. When receiving the touch operation performed on the interactive object by the user, the input management module 71a obtains the system attribute reading object 72a from the Unity engine 72 in a reflection manner, and reads, by using the system attribute reading object 72a, a logical pixel density of the touchscreen from a core database 73 loaded when the Android system is run. Specifically, the logical pixel density (also referred to as DensityDpi) may be read from the core database 73 by using a Java virtual machine 74.

In another possible implementation, the core component may provide an obtaining interface of a physical pixel density to the outside. That is, the core component may autonomously obtain the physical pixel density of the screen and provide a query service of the physical pixel density to the outside. In some terminals, the physical pixel density of the touchscreen is the same as the logical pixel density of the touchscreen. Therefore, in a case that the logical pixel density of the touchscreen is the same as the physical pixel density of the touchscreen, a third API provided by the core component can be invoked directly to obtain the physical pixel density, and the obtained physical pixel density is determined as the logical pixel density.

In a practical application, some third-party core components providing support to the application corresponding to the interactive object also provide an obtaining interface of a screen pixel density to the outside. The application may invoke the obtaining interface of the screen pixel density to obtain the screen pixel density of electronic devices. The screen pixel density is usually an average of a physical pixel density of the screen of the electronic device in an x direction (xdpi) and a physical pixel density of the screen of the electronic device in a y direction (ydpi). For example, the obtaining interface of the screen pixel density provided by the Unity engine to the outside is a Screem.dpi API. By invoking the Screem.dpi API, the application can directly obtain the screen pixel density of the electronic device (also referred to as ScreemDpi). In some electronic devices, the screen pixel density obtained by using the third-party core component is the same as the logical pixel density of the screen of the electronic device. In this case, to obtain the logical pixel density of the screen of the electronic device more rapidly so as to improve a response speed to the touch operation, in a case that the screen pixel density of the electronic device is the same as the logical pixel density of the screen of the electronic device, the logical pixel density of the screen can be directly obtained through the API interface provided by the third-party core component.

Figure 8:
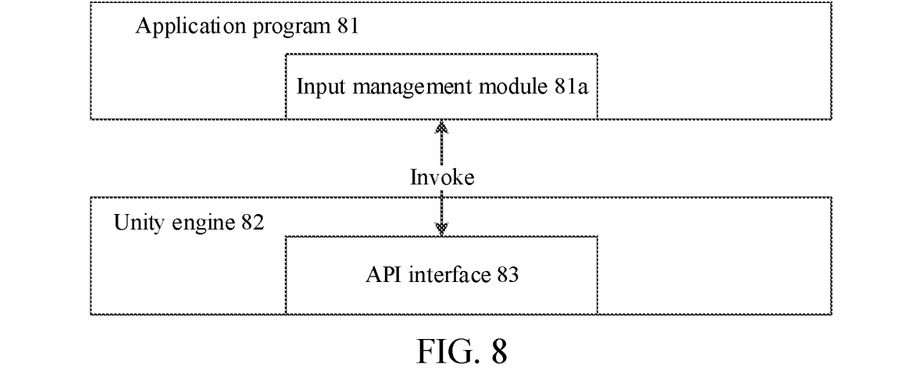
FIG. 8 is another schematic flowchart of obtaining a logical pixel density used in the embodiment of FIG. 3.

By an example in which the core component is a Unity engine and the operating system of the terminal is an iOS system, the screen pixel density and the logical pixel density are the same in an electronic device in which the iOS system is run. FIG. 8 is a schematic flowchart of obtaining a logical pixel density according to this embodiment of this application. In FIG. 8, an application program corresponding to an interactive object is an application program 81. The application program 81 includes an input management module 81*a*. The input management module 81*a* is configured to manage a touch operation performed on the interactive object by a user. A Unity engine 82 provides support to the application program 81, and the Unity engine 82 includes an API interface 83 that provides a ScreemDpi reading function to the outside (for example, the API interface 83 may be a Screem.dpi API). When receiving the touch operation of the user on the interactive object, the input management module 81*a* obtains a screen pixel density ScreemDpi by invoking the API interface, and determines the ScreemDpi as the logical pixel density.

Step S303: The terminal corrects the quantity of logical pixels corresponding to the touch operation based on the logical pixel density and a reference pixel density.

In this embodiment of this application, when correcting the quantity of logical pixels corresponding to the touch operation, a product of the quantity of logical pixels corresponding to the touch operation and the reference pixel density may be divided by the logical pixel density to obtain the corrected quantity of logical pixels. A corresponding first correction formula is as follows:

$$N = N_1 * \frac{D_0}{D_1};$$

N is the corrected quantity of logical pixels, Ni is the quantity of logical pixels corresponding to the touch operation, Do is the reference pixel density, and Di is the logical pixel density.

The reference pixel density is a preset pixel density. When developing an application, a developer develops the application based on the reference pixel density. The reference pixel density may be a logical pixel density of a screen of a terminal of a model that has a relatively high proportion in the market.

By correcting the quantity of logical pixels corresponding to the touch operation, when the interactive object is controlled based on the corrected quantity of logical pixels subsequently, for the same application, on different touch control screens, the corrected quantity of logical pixels that corresponds to the touch operation corresponding to the same physical distance is to be the same. Correspondingly, the control effects for the interactive object are also the same.

In another possible implementation, to be run on terminals with relatively low performance, some human-computer interaction applications support multiple different resolutions. Therefore, if the application supports multiple different resolutions, a current resolution of the application further needs to be considered when correcting the quantity of logical pixels corresponding to the touch operation. Specifically, a resolution scaling factor of the interactive object may be obtained during correcting, where the resolution scaling factor is a ratio of a current resolution to a default resolution of an application interface corresponding to the interactive object. After dividing a product of the quantity of logical pixels corresponding to the touch operation and the reference pixel density by the logical pixel density, the result is multiplied to the resolution scaling factor to obtain the corrected quantity of logical pixels. A corresponding second correction formula is as follows:

$$N = N_1 * \frac{D_0}{D_1} * Q;$$

N is the corrected quantity of logical pixels, $N_1$ is the quantity of logical pixels corresponding to the touch operation, Do is the reference pixel density, $D_1$ is the logical pixel density, and Q is the resolution scaling factor.

In a practical application, to be compatible with electronic devices of different processing performance, some applications may support different screen resolutions. That is, for the same application, in some electronic devices with relatively high performance, screen resolutions are relatively high (for example, the screen resolution may be 1920× 1080), while in some electronic devices with relatively low performance, screen resolutions may be relatively low (for example, the screen resolution may be 1024×768). Therefore, for applications that support multiple different screen resolutions, when correcting the quantity of logical pixels corresponding to the touch operation, a screen resolution currently displayed by the application further needs to be considered. In this embodiment of this application, a unified default resolution is set in advance. When correcting the quantity of logical pixels corresponding to the touch operation, the quantity of logical pixels corresponding to the touch operation is multiplied to the ratio of the current resolution to the default resolution of the application interface, and therefore influences of different screen resolutions on the operation result of the touch operation can be eliminated.

Step S304: The terminal controls the interactive object based on the corrected quantity of logical pixels.

When controlling the interactive object to rotate, a rotation angle of the interactive object can be calculated based on the corrected quantity of logical pixels, and the interactive object is controlled to rotate based on the rotation angle obtained through calculation.

Alternatively, when controlling the interactive object to move, a pixel distance by which the interactive object moves can be calculated based on the corrected quantity of logical pixels, and the interactive object is controlled to move based on the pixel distance obtained through calculation.

In conclusion, according to the method shown in this embodiment of this application, after the quantity of logical pixels corresponding to the touch operation performed on the interactive object is obtained, the interactive object is not controlled directly based on the quantity of logical pixels corresponding to the touch operation; instead, the quantity of logical pixels corresponding to the touch operation is corrected based on the logical pixel density of the touchscreen and the reference pixel density and then the interactive object is controlled based on the corrected quantity of logical pixels, so that when a sliding control operation of the same physical distance is performed on any plurality of touchscreens, no matter whether logical pixel densities of the touchscreens are the same, control effects for the interactive object are finally consistent.

In addition, according to the method shown in this embodiment of this application, when correcting the quantity of logical pixels corresponding to the touch operation, the quantity of logical pixels corresponding to the touch operation is multiplied to the ratio of the current resolution to the default resolution of the application interface, and therefore influences of different screen resolutions on the operation result of the touch operation can be eliminated.

The solution shown in the embodiment corresponding to FIG. 3 can be applied in various application scenarios related to touch interaction, especially in scenarios in which a requirement on accuracy of the touch control is relatively high, for example, in competitive games involving touch operations. Typically, the foregoing method can be applied to a first-person shooting (FPS) game or an action real-time strategy (ARTS) game that relies on the touch operation.

Figure 9:
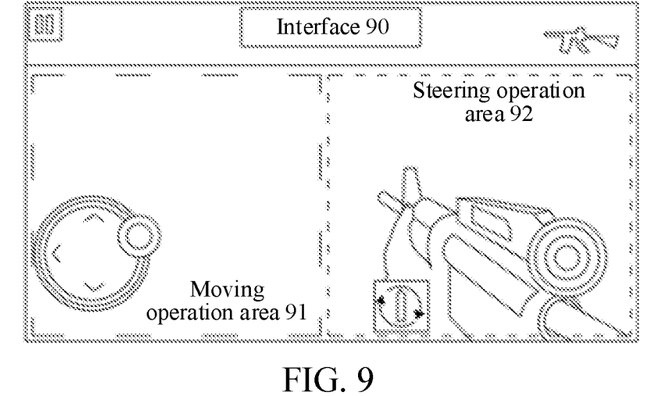
FIG. 9 is a schematic diagram of an interactive interface according to an exemplary embodiment of this application.

For example, by an example in which the solution is applied to an FPS mobile game run in a smart phone, FIG. 9 is a schematic diagram of an interactive interface shown in an exemplary embodiment. As shown in FIG. 9, an interface 90 of the FPS mobile game is divided into at least two operation areas, which include at least a moving operation area 91 on the left side of the interface and a steering operation area 92 on the right side of the interface.

When the smart phone detects a sliding operation in the moving operation area 91, a quantity of logical pixels corresponding to the sliding operation is obtained, and the obtained quantity of logical pixels is corrected based on a ratio of a reference pixel density to a current logical pixel density of the smart phone and a ratio of a current resolution of a game interface to a default resolution, to obtain the corrected quantity of logical pixels. In addition, an interactive object is controlled to move by a corresponding distance based on a relationship between the corrected quantity of logical pixels and the moving distance of the interactive object. In the game interface shown in FIG. 9, moving of the interactive object may be specifically represented as push and translation of a game scene relative to a virtual character.

When the smart phone detects a sliding operation in the steering operation area 92, a quantity of logical pixels corresponding to the sliding operation is obtained, and the obtained quantity of logical pixels is corrected based on the ratio of the reference pixel density to the current logical pixel density of the smart phone and the ratio of the current resolution of the game interface to the default resolution, to obtain the corrected quantity of logical pixels. In addition, the interactive object is controlled to rotate by a corresponding angle based on a relationship between the corrected quantity of logical pixels and a steering angle of the interactive object. In the game interface shown in FIG. 9, rotation of the interactive object may be specifically represented as rotation of direction of the game scene relative to the virtual character.

Figure 10:
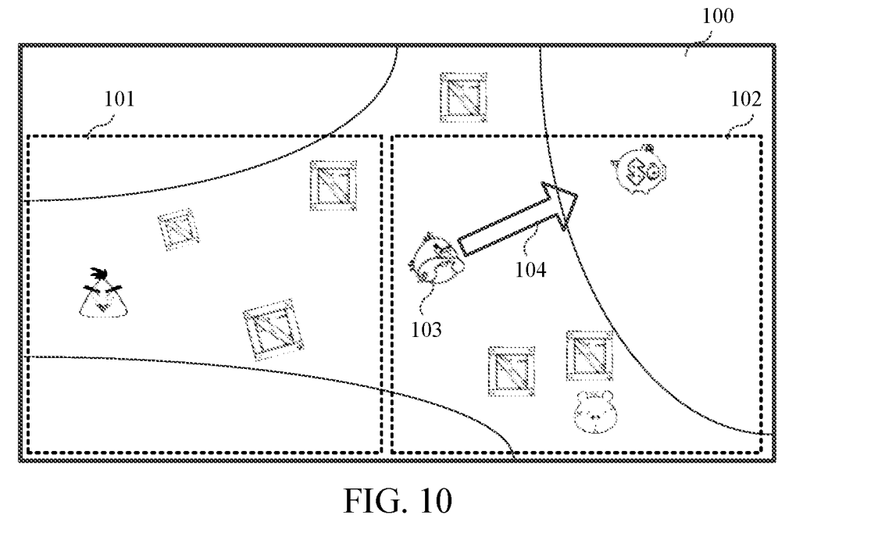
FIG. 10 is a schematic diagram of another interactive interface according to an exemplary embodiment of this application.

By an example in which the solution is applied to an ARTS mobile game run in a smart phone, FIG. 10 is a schematic diagram of an interactive interface shown in an exemplary embodiment. As shown in FIG. 10, an interface 100 of the ARTS mobile game is divided into at least two operation areas, which include at least a moving operation area 101 on the left side of the interface and a pointing operation area 102 on the right side of the interface. In addition, an interactive object 103 is displayed in the interface 100. Under trigger of some conditions (for example, when the pointing operation area 102 receives a touch operation), a pointing mark 104 is further displayed in a location of the interface 100 and corresponding to the interactive object 103. The pointing mark 104 is used for indicating a pointing direction of the interactive object 103 (which may be specifically a shooting direction of the interactive object 103 or a "skill" release direction of the interactive object 103).

When the smart phone detects a sliding operation in the moving operation area 101, a quantity of logical pixels corresponding to the sliding operation is obtained, and the obtained quantity of logical pixels is corrected based on a ratio of a reference pixel density to a current logical pixel density of the smart phone and a ratio of a current resolution of a game interface to a default resolution, to obtain the corrected quantity of logical pixels. In addition, the interactive object 103 is controlled to move by a corresponding distance based on a relationship between the corrected quantity of logical pixels and the moving distance of the interactive object. In the game interface shown in FIG. 10, moving of the interactive object may be specifically represented as moving of the interactive object 103 in a game scene.

When the smart phone detects a sliding operation in the pointing operation area 102, a quantity of logical pixels corresponding to the sliding operation is obtained, and the obtained quantity of logical pixels is corrected based on the ratio of the reference pixel density to the current logical pixel density of the smart phone and the ratio of the current resolution of the game interface to the default resolution, to obtain the corrected quantity of logical pixels. In addition, the interactive object is controlled to rotate by a corresponding angle based on a relationship between the corrected quantity of logical pixels and a steering angle of the interactive object. In the game interface shown in FIG. 10, rotation of the interactive object may be represented as rotation in a pointed direction of the pointing mark 104.

By using the foregoing solutions, when the same FPS mobile game or ARTS mobile game is run in electronic devices corresponding to screens with different sizes of touchscreens or different logical pixel densities, for touch operations of the same operation amplitude, a moving distance or a steering angle of an interactive object may also be kept consistent. Therefore, an operation difference of running the same game in different electronic devices is avoided.

The following is an apparatus embodiment of this application, which may be used to perform the method embodiment of this application. For details not disclosed in the apparatus embodiment of this application, refer to the method embodiment of this application.

Figure 11:
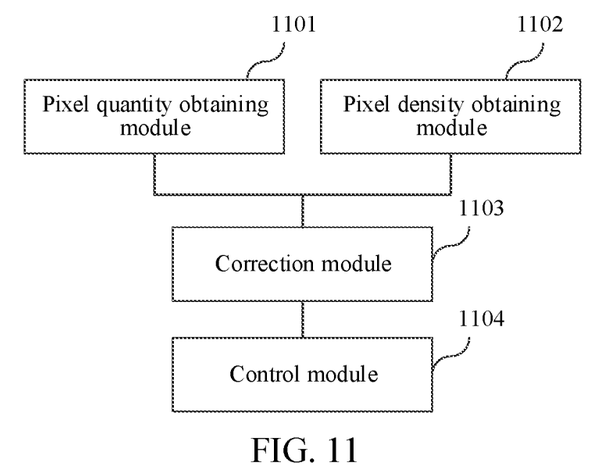
FIG. 11 is a block diagram of an interactive object control apparatus according to an exemplary embodiment of this application.

Referring to FIG. 11, FIG. 11 is a block diagram of an interactive object control apparatus according to an exemplary embodiment. The interactive object control apparatus may be implemented, by using hardware or a combination of software and hardware, as all or a part of an electronic device on which a human-computer interaction application is installed. The electronic device has a touchscreen, and a control operation on an interactive object displayed on an interface of a human-computer interaction application is implemented by using a touch operation on the touchscreen. For example, the electronic device may be a smart phone, a tablet computer, an e-book reader, a professional game device with a touchscreen, and the like. The interactive object control apparatus may include one or more processors and one or more memories storing program units, where the program units are executed by the processor, and the program units include:

a pixel quantity obtaining module 1101, configured to obtain a quantity of logical pixels corresponding to a touch operation performed on an interactive object on a touchscreen of a terminal;

a pixel density obtaining module 1102, configured to obtain a logical pixel density of the touchscreen, the logical pixel density being used for indicating a quantity of logical pixels included in a unit area of the touchscreen;

a correction module 1103, configured to correct the quantity of logical pixels corresponding to the touch operation based on the logical pixel density and a reference pixel density; and a control module 1104, configured to control the interactive object based on the corrected quantity of logical pixels.

Optionally, the pixel density obtaining module includes:

an object obtaining unit, configured to obtain a system attribute reading object provided by a core component, where the core component is a third-party core component providing support to an application corresponding to the interactive object, and the system attribute reading object provides a first application programming interface (API) to the outside; and a first invoking unit, configured to invoke the first API to obtain the logical pixel density returned by the system attribute reading object, where the logical pixel density is obtained by invoking, by the system attribute reading object, a second API provided by the operating system of the terminal.

Optionally, in a case that the logical pixel density of the touchscreen is the same as the physical pixel density of the touchscreen, the pixel density obtaining module includes:

a second invoking unit, configured to invoke a third API provided by a core component to obtain the physical pixel density, where the core component is a third-party core component providing support to an application corresponding to the interactive object; and a determining unit, configured to determine the obtained physical pixel density as the logical pixel density.

Optionally, the correction module is configured to divide a product of the quantity of logical pixels corresponding to the touch operation and the reference pixel density by the logical pixel density to obtain the corrected quantity of logical pixels.

Optionally, the correction module includes:

a factor obtaining unit, configured to obtain a resolution scaling factor of the interactive object, where the resolution scaling factor is a ratio of a current resolution to a default resolution of an application interface corresponding to the interactive object; and a correction unit, configured to: after the dividing a product of the quantity of logical pixels corresponding to the touch operation and the reference pixel density by the logical pixel density, multiply the result to the resolution scaling factor to obtain the corrected quantity of logical pixels.

Optionally, the control module includes:

an angle calculating unit, configured to calculate a rotation angle of the interactive object based on the corrected quantity of logical pixels; and a rotation control unit, configured to control, based on the rotation angle obtained through calculation, the interactive object to rotate.

Optionally, the control module includes:

a distance calculating unit, configured to calculate, based on the corrected quantity of logical pixels, a pixel distance by which the interactive object moves; and a movement control unit, configured to control, based on the pixel distance obtained through calculation, the interactive object to move.

In conclusion, according to the apparatus shown in this embodiment of this application, after the quantity of logical pixels corresponding to the touch operation performed on the interactive object is obtained, the interactive object is not controlled directly based on the quantity of logical pixels corresponding to the touch operation; instead, the quantity of logical pixels corresponding to the touch operation is corrected based on the logical pixel density of the touchscreen and the reference pixel density and then the interactive object is controlled based on the corrected quantity of logical pixels, so that when a sliding control operation of the same physical distance is performed on any plurality of touchscreens, no matter whether logical pixel densities of the touchscreens are the same, control effects for the interactive object are finally consistent.

In addition, according to the apparatus shown in this embodiment of this application, when correcting the quantity of logical pixels corresponding to the touch operation, the quantity of logical pixels corresponding to the touch operation is multiplied to the ratio of the current resolution to the default resolution of the application interface, and therefore influences of different screen resolutions on the operation result of the touch operation can be eliminated.

An embodiment of this application further provides a non-transitory computer-readable storage medium including instructions, for example, a storage device including instructions. The instructions may be executed by a processor of an electronic device to implement the interactive object control method shown in the embodiments of this application. For example, the non-transitory computer-readable storage medium may be a ROM, a random access memory (RAM), a CD-ROM, a magnetic tape, a floppy disk, an optical data storage device, or the like.

Figure 12:
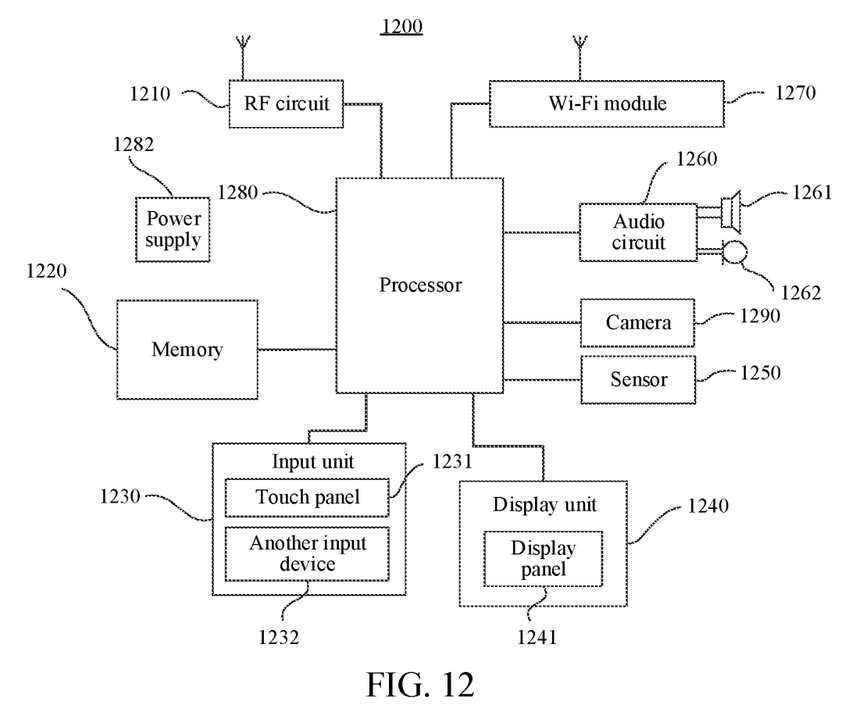
FIG. 12 is a schematic structural diagram of an electronic device according to an exemplary embodiment of this application.

FIG. 12 is a schematic structural diagram of an electronic device 1200 according to an exemplary embodiment. The electronic device 1200 in this embodiment of this application may include one or more components as follows: a processor configured to execute a computer program instruction to complete various processes and methods, a random access memory (RAM) and a read-only memory (ROM) that are configured to store information and a program instruction, a memory configured to store data and information, an I/O device, an interface, an antenna, and the like. Specifically:

The electronic device 1200 may include components such as a radio frequency (RF) circuit 1210, a memory 1220, an input unit 1230, a display unit 1240, a sensor 1250, an audio circuit 1260, a wireless fidelity (Wi-Fi) module 1270, a processor 1280, a power supply 1282, and a camera 1290. A person skilled in the art may understand that the structure of the electronic device shown in FIG. 12 does not constitute a limitation to the electronic device, and the electronic device may include more components or fewer components than those shown in the figure, or some components may be combined, or a different component deployment may be used.

The following describes the components of the electronic device 1200 in detail with reference to FIG. 12.

The RF circuit 1210 may be configured to receive and send signals during an information receiving and sending process or a call process. Particularly, the RF circuit 1210 receives downlink information from a base station, then delivers the downlink information to the processor 1280 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 1210 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1220 may be configured to store a software program and module. The processor 1280 runs the software program and module stored in the memory 1220, to perform various functional applications and data processing of the electronic device 1200. The memory 1220 may mainly include a program storage area and a data storage area. The program storage area may store an operating system, an application required by at least one function (such as a sound playback function and an image display function), and the like. The data storage area may store data (such as audio data and an address book) created according to use of the electronic device 1200, and the like. In addition, the memory 1220 may include a high speed random access memory, and may also include a non-volatile memory, such as at least one magnetic disk storage device, a flash memory, or another volatile solid-state storage device.

The input unit 1230 may be configured to receive input digit or character information, and generate a keyboard signal input related to the user setting and function control of the electronic device 1200. Specifically, the input unit 1230 may include a touch panel 1231 and another input device 1232. The touch panel 1231 may also be referred to as a touchscreen, and may collect a touch operation of a user on or near the touch panel (such as an operation of a user on or near the touch panel 1231 using any suitable object or attachment, such as a finger or a stylus), and drive a corresponding connection apparatus according to a preset program. Optionally, the touch panel 1231 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 1280. Moreover, the touch controller may receive and execute a command sent from the processor 1280. In addition, the touch panel 1231 may be implemented using various types, such as a resistive type, a capacitance type, an infrared type, and a surface acoustic wave type. In addition to the touch panel 1231, the input unit 1230 may further include the another input device 1232. Specifically, the another input device 1232 may include, but is not limited to, one or more of a physical keyboard, a functional key (such as a volume control key or a switch key), a track ball, a mouse, and a joystick.

The display unit 1240 may be configured to display information entered by the user or information provided for the user, and various menus of the electronic device 1200. The display unit 1240 may include a display panel 1241. Optionally, the display panel 1241 may be configured by using a liquid crystal display (LCD), an organic light-emitting diode (OLED), or the like. Further, the touch panel 1231 may cover the display panel 1241. After detecting a touch operation on or near the touch panel 1231, the touch panel 1231 transfers the touch operation to the processor 1280, so as to determine a type of a touch event. Then, the processor 1280 provides a corresponding visual output on the display panel 1241 according to the type of the touch event. Although in FIG. 12, the touch panel 1231 and the display panel 1241 are used as two separate parts to implement input and output functions of the electronic device 1200, in some embodiments, the touch panel 1231 and the display panel 1241 may be integrated to implement the input and output functions of the electronic device 1200.

The electronic device 1200 may further include at least one sensor 1250, such as a gyro sensor, a magnetic induction sensor, an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the electronic device 1200 is moved to the ear. As one type of motion sensor, an acceleration sensor may detect magnitude of accelerations in various directions (which generally are triaxial), may detect magnitude and a direction of the gravity when static, and may be configured to identify an application of an electronic device posture (such as switchover between horizontal and vertical screens, a related game, and posture calibration of a magnetometer), a related function of vibration identification (such as a pedometer and a knock). Other sensors, such as a barometer, a hygrometer, a thermometer, and an infrared sensor, which may be configured in the electronic device 1200 are not further described in detail herein.

The audio circuit 1260, a speaker 1281, and a microphone 1262 may provide audio interfaces between the user and the electronic device 1200. The audio circuit 1260 may transmit, to the speaker 1261, an electric signal converted from received audio data. The speaker 1261 converts the electric signal into a sound signal for output. On the other hand, the microphone 1262 converts a collected sound signal into an electric signal. The audio circuit 1260 receives the electric signal and converts the electric signal into audio data, and outputs the audio data to the processor 1280 for processing. Then, the processor 1280 sends the audio data to, for example, another electronic device using the RF circuit 1210, or outputs the audio data to the memory 1220 for further processing.

Wi-Fi is related to a short distance wireless transmission technology. The electronic device 1200 may help, using the Wi-Fi module 1270, a user to receive and send an e-mail, browse a web page, access streaming media, and the like, which provides wireless broadband Internet access for the user. Although FIG. 12 shows the Wi-Fi module 1270, it may be understood that the Wi-Fi module 1270 is not a necessary component of the electronic device 1200, and may be omitted according to demands without changing the scope of the essence of this application.

The processor 1280 is a control center of the electronic device 1200, and is connected to various parts of the electronic device using various interfaces and lines. By running or executing the software program and/or the module stored in the memory 1220, and invoking data stored in the memory 1220, the processor 1280 performs various functions and data processing of the electronic device 1200, thereby performing overall monitoring on the electronic device. Optionally, the processor 1280 may include one or more processing units. Preferably, the processor 1280 may integrate an application processor and a modem processor. The application processor mainly processes an operating system, a user interface, an application, and the like. The modem processor mainly processes wireless communication. It may be understood that the foregoing modem processor may either not be integrated into the processor 1280.

The electronic device 1200 further includes the power supply 1282 (such as a battery) for supplying power to the components. Preferably, the power supply may be logically connected to the processor 1280 using a power supply management system, thereby implementing functions, such as charging, discharging, and power consumption management, using the power supply management system.

The camera 1290 is generally formed by a lens, an image sensor, an interface, a digital signal processor, a CPU, a display screen, and the like. The lens is fixed above the image sensor, and the focus can be changed by manually adjusting the lens. The image sensor is equivalent to a "film" of a conventional camera and is a core for the camera to capture an image. The interface is configured to connect the camera to a motherboard of an electronic device by using a cable and a board-to-board connector in a spring-type connection manner, and send a captured image to the memory 1220. The digital signal processor processes the captured image by performing a mathematical operation, converts a captured analog image into a digital image, and sends the digital image to the memory 1220 through the interface.

Although not shown in the figure, the electronic device 1200 may further include a Bluetooth module and the like, and details are not described herein again.

In addition to the one or more processors 1280, the electronic device 1200 further includes a memory and one or more modules. The one or more modules are stored in the memory, and are configured to be executed by the one or more processors, to implement all or some of the steps of the method according to FIG. 3.

This application is intended to cover any variations, uses, or adaptive changes of the embodiments of this application. Such variations, uses, or adaptive changes follow the general principles of the embodiments of this application and include common general knowledge or common technical means in the art that is not described in the embodiments of this application. The specification and the embodiments are merely exemplary, and the scope of the embodiments of this application are set forth in the following claims.

It is to be understood that the embodiments of this application are not limited to the precise structures described above and shown in the accompanying drawings, and various modifications and changes can be made without departing from the scope of the embodiments of this application. The scope of the embodiments of this application is limited by the appended claims.

What is claimed is:

1. An interactive object control method performed at a terminal having one or more processors and memory storing a plurality of programs to be executed by the one or more processors, comprising:

obtaining, by the terminal, a quantity of logical pixels corresponding to a touch operation performed on an interactive object on a touchscreen of the terminal;

obtaining, by the terminal, a logical pixel density of the touchscreen, the logical pixel density being used for indicating a quantity of logical pixels comprised in a unit area of the touchscreen;

correcting, by the terminal, the quantity of logical pixels corresponding to the touch operation based on the logical pixel density and a reference pixel density; and controlling, by the terminal, the interactive object based on the corrected quantity of logical pixels.

2. The method according to claim 1, wherein the obtaining, by the terminal, a logical pixel density of the touchscreen comprises:

obtaining a system attribute reading object provided by a core component, wherein the core component is a third-party core component providing support to an application corresponding to the interactive object, and the system attribute reading object provides a first application programming interface (API) to the outside; and invoking the first API to obtain the logical pixel density returned by the system attribute reading object, wherein the logical pixel density is obtained by invoking, by the system attribute reading object, a second API provided by an operating system of the terminal.

3. The method according to claim 1, wherein in a case that the logical pixel density of the touchscreen is the same as a physical pixel density of the touchscreen, the obtaining, by the terminal, a logical pixel density of the touchscreen comprises:

invoking a third API provided by a core component to obtain the physical pixel density, wherein the core component is a third-party core component providing support to an application corresponding to the interactive object; and determining the obtained physical pixel density as the logical pixel density.

4. The method according to claim 1, wherein the correcting, by the terminal, the quantity of logical pixels corresponding to the touch operation based on the logical pixel density and a reference pixel density comprises:

dividing a product of the quantity of logical pixels corresponding to the touch operation and the reference pixel density by the logical pixel density to obtain the corrected quantity of logical pixels.

5. The method according to claim 4, wherein the controlling, by the terminal, the interactive object based on the corrected quantity of logical pixels comprises:

calculating a rotation angle of the interactive object based on the corrected quantity of logical pixels; and controlling, based on the rotation angle obtained through calculation, the interactive object to rotate.

6. The method according to claim 4, wherein the controlling, by the terminal, the interactive object based on the corrected quantity of logical pixels comprises:

calculating, based on the corrected quantity of logical pixels, a pixel distance by which the interactive object moves; and controlling, based on the pixel distance obtained through calculation, the interactive object to move.

7. The method according to claim 1, wherein the correcting, by the terminal, the quantity of logical pixels corresponding to the touch operation based on the logical pixel density and a reference pixel density comprises:

obtaining a resolution scaling factor of the interactive object, wherein the resolution scaling factor is a ratio of a current resolution to a default resolution of an application interface corresponding to the interactive object; and after the dividing a product of the quantity of logical pixels corresponding to the touch operation and the reference pixel density by the logical pixel density, multiplying the result to the resolution scaling factor to obtain the corrected quantity of logical pixels.

8. A terminal comprising one or more processors, memory coupled to the one or more processors and a plurality of programs stored in the memory that, when executed by the one or more processors, cause the terminal to perform a plurality of operations comprising:

obtaining, by the terminal, a quantity of logical pixels corresponding to a touch operation performed on an interactive object on a touchscreen of the terminal;

obtaining, by the terminal, a logical pixel density of the touchscreen, the logical pixel density being used for indicating a quantity of logical pixels comprised in a unit area of the touchscreen;

correcting, by the terminal, the quantity of logical pixels corresponding to the touch operation based on the logical pixel density and a reference pixel density; and controlling, by the terminal, the interactive object based on the corrected quantity of logical pixels.

9. The terminal according to claim 8, wherein the obtaining, by the terminal, a logical pixel density of the touchscreen comprises:

obtaining a system attribute reading object provided by a core component, wherein the core component is a third-party core component providing support to an application corresponding to the interactive object, and the system attribute reading object provides a first application programming interface (API) to the outside; and invoking the first API to obtain the logical pixel density returned by the system attribute reading object, wherein the logical pixel density is obtained by invoking, by the system attribute reading object, a second API provided by an operating system of the terminal.

10. The terminal according to claim 8, wherein in a case that the logical pixel density of the touchscreen is the same as a physical pixel density of the touchscreen, the obtaining, by the terminal, a logical pixel density of the touchscreen comprises:

invoking a third API provided by a core component to obtain the physical pixel density, wherein the core component is a third-party core component providing support to an application corresponding to the interactive object; and determining the obtained physical pixel density as the logical pixel density.

11. The terminal according to claim 8, wherein the correcting, by the terminal, the quantity of logical pixels corresponding to the touch operation based on the logical pixel density and a reference pixel density comprises:

dividing a product of the quantity of logical pixels corresponding to the touch operation and the reference pixel density by the logical pixel density to obtain the corrected quantity of logical pixels.

12. The terminal according to claim 11, wherein the controlling, by the terminal, the interactive object based on the corrected quantity of logical pixels comprises:

calculating a rotation angle of the interactive object based on the corrected quantity of logical pixels; and controlling, based on the rotation angle obtained through calculation, the interactive object to rotate.

13. The terminal according to claim 11, wherein the controlling, by the terminal, the interactive object based on the corrected quantity of logical pixels comprises:

calculating, based on the corrected quantity of logical pixels, a pixel distance by which the interactive object moves; and controlling, based on the pixel distance obtained through calculation, the interactive object to move.

14. The terminal according to claim 8, wherein the correcting, by the terminal, the quantity of logical pixels corresponding to the touch operation based on the logical pixel density and a reference pixel density comprises:

obtaining a resolution scaling factor of the interactive object, wherein the resolution scaling factor is a ratio of a current resolution to a default resolution of an application interface corresponding to the interactive object; and after the dividing a product of the quantity of logical pixels corresponding to the touch operation and the reference pixel density by the logical pixel density, multiplying the result to the resolution scaling factor to obtain the corrected quantity of logical pixels.

15. A non-transitory computer readable storage medium storing a plurality of machine readable instructions in connection with a terminal having one or more processors, wherein the plurality of machine readable instructions, when executed by the one or more processors, cause the terminal to perform a plurality of operations including:

obtaining, by the terminal, a quantity of logical pixels corresponding to a touch operation performed on an interactive object on a touchscreen of the terminal;

obtaining, by the terminal, a logical pixel density of the touchscreen, the logical pixel density being used for indicating a quantity of logical pixels comprised in a unit area of the touchscreen;

correcting, by the terminal, the quantity of logical pixels corresponding to the touch operation based on the logical pixel density and a reference pixel density; and controlling, by the terminal, the interactive object based on the corrected quantity of logical pixels.

16. The non-transitory computer readable storage medium according to claim 15, wherein the obtaining, by the terminal, a logical pixel density of the touchscreen comprises:

obtaining a system attribute reading object provided by a core component, wherein the core component is a third-party core component providing support to an application corresponding to the interactive object, and the system attribute reading object provides a first application programming interface (API) to the outside; and invoking the first API to obtain the logical pixel density returned by the system attribute reading object, wherein the logical pixel density is obtained by invoking, by the system attribute reading object, a second API provided by an operating system of the terminal.

17. The non-transitory computer readable storage medium according to claim 15, wherein in a case that the logical pixel density of the touchscreen is the same as a physical pixel density of the touchscreen, the obtaining, by the terminal, a logical pixel density of the touchscreen comprises:

invoking a third API provided by a core component to obtain the physical pixel density, wherein the core component is a third-party core component providing support to an application corresponding to the interactive object; and determining the obtained physical pixel density as the logical pixel density.

18. The non-transitory computer readable storage medium according to claim 15, wherein the correcting, by the terminal, the quantity of logical pixels corresponding to the touch operation based on the logical pixel density and a reference pixel density comprises:

dividing a product of the quantity of logical pixels corresponding to the touch operation and the reference pixel density by the logical pixel density to obtain the corrected quantity of logical pixels.

19. The non-transitory computer readable storage medium according to claim 18, wherein the controlling, by the terminal, the interactive object based on the corrected quantity of logical pixels comprises:

calculating a rotation angle of the interactive object based on the corrected quantity of logical pixels; and controlling, based on the rotation angle obtained through calculation, the interactive object to rotate.

20. The non-transitory computer readable storage medium according to claim 15, wherein the correcting, by the terminal, the quantity of logical pixels corresponding to the touch operation based on the logical pixel density and a reference pixel density comprises:

obtaining a resolution scaling factor of the interactive object, wherein the resolution scaling factor is a ratio of a current resolution to a default resolution of an application interface corresponding to the interactive object; and after the dividing a product of the quantity of logical pixels corresponding to the touch operation and the reference pixel density by the logical pixel density, multiplying the result to the resolution scaling factor to obtain the corrected quantity of logical pixels.

* * * * *